United States Patent [19]
Antony et al.

[11] Patent Number: 5,857,389
[45] Date of Patent: Jan. 12, 1999

[54] UNIVERSAL MOUNT HOUSING CONSTRUCTION FOR PARALLEL OFFSET GEARBOXES AND GEARMOTORS

[75] Inventors: Gerhard Antony; William M. Lechler, both of Virginia Beach, Va.

[73] Assignee: Sumitomo Machinery Corp. of America, Chesapeake, Va.

Related U.S. Application Data

[60] Provisional application No. 60/018,556, May 29, 1996.

[21] Appl. No.: 864,360
[22] Filed: May 28, 1997
[51] Int. Cl.$^6$ .................................................. F16H 57/02
[52] U.S. Cl. ............................................................. 74/606 R
[58] Field of Search ............................. 74/606 R, 417, 74/665 R, 607

[56] References Cited

U.S. PATENT DOCUMENTS

| | | | |
|---|---|---|---|
| 1,164,419 | 12/1915 | Smith et al. . | |
| 2,313,548 | 3/1943 | Hodge | 74/606 R |
| 2,342,941 | 2/1944 | Johnson et al. | 74/606 R |
| 2,600,912 | 6/1952 | Olson | 74/606 R |
| 2,623,406 | 12/1952 | Hansen . | |
| 2,762,232 | 9/1956 | Bade | 74/606 R |
| 2,952,165 | 9/1960 | Bade | 74/606 R |
| 3,214,989 | 11/1965 | Wellauer et al. | 74/606 R X |
| 3,236,114 | 2/1966 | Freber . | |
| 3,864,990 | 2/1975 | Lacoste | 74/606 R |
| 5,094,767 | 3/1992 | Spridco et al. | 74/600 R X |
| 5,203,231 | 4/1993 | Minegishi et al. | 74/606 R |
| 5,339,708 | 8/1994 | Nakamura | 74/665 |
| 5,584,207 | 12/1996 | Paul et al. | 74/606 R X |
| 5,634,384 | 6/1997 | Hofmann | 74/606 R |
| 5,682,799 | 11/1997 | Dimov | 74/606 R |

FOREIGN PATENT DOCUMENTS

| | | |
|---|---|---|
| 219918 | 2/1962 | Austria . |
| 1276339 | 10/1961 | France . |
| 818716 A | 10/1951 | Germany . |
| 4121299 | 1/1992 | Germany . |

*Primary Examiner*—Vinh T. Luong
*Attorney, Agent, or Firm*—Jeffrey L. Thompson; Thompson & Thompson, P.A.

[57] ABSTRACT

A universal mount housing construction for parallel offset gearboxes that includes a generally cubic-shaped cast housing member having an input opening in a first side for receiving a rotational power input, and an output opening in a second side for transmitting a rotational power output through a hollow or solid output shaft. Two plate-shaped housing extensions are integrated into the cast housing member and provide a pair of integrated torque arms. Each of the integrated housing extensions have a machined planar surface oriented perpendicular to the central axis of the output opening, and a through-bore extending through the machined surface. A raised ring surface extends around the output opening and has a machined planar surface which is coplanar with the machined planar surfaces of the integrated housing extensions. The raised ring surface has tapped holes spaced about its circumference for flange mounting. Two parallel raised machined surfaces with tapped holes are formed on the sides of the cast housing member and are oriented parallel to the central axis of the output opening to permit a versatile housing mount arrangement.

9 Claims, 5 Drawing Sheets

UNIVERSAL MOUNT HOUSING CONSTRUCTION FOR PARALLEL OFFSET GEARBOXES AND GEARMOTORS

This application claims benefit of provisional application Ser. No. 60/018,556 filed May 29, 1996.

BACKGROUND OF THE INVENTION

1. Field of the Invention

The present invention relates generally to general purpose and industrial power transmission devices and, in particular, to a novel housing construction for gearboxes and gearmotors that allows a wide variety of mounting and torque support configurations.

2. Description of the Related Art

The vast majority of machinery utilizes rotational mechanical energy as a power input to perform a given function. This rotational mechanical energy is generated by a prime mover, such as an electric motor, hydraulic motor, gas engine, or the like, and in most cases is further "conditioned" to the required torque and speed level by using a geared reducer arrangement. The input torque and speed generating device (i.e., the driving device or drive) needs to be adequately supported by the structure or by the foundation of the machinery (i.e., the driven device) to generate the reaction torque necessary for the torque equilibrium.

The housing construction of the drive has to be designed and shaped appropriately to allow an easy attachment to the driven machinery, to secure the alignment of the drive and driven shaft, and to support the drive weight, thereby giving support to generate the required reaction torque. The most common mounting arrangements are mounting feet, flanges, brackets and torque arms. Torque arms are widely used with drive units having hollow bore output shafts where the solid shaft of the driven machinery is inserted into the bore of the driving unit. This type of drive arrangement (also called "shaft mount" gearboxes or gearmotors) secures inherently the alignment of the driven and drive shafts. The driven shaft also supports the weight of the drive. An appropriate torque arm arrangement is required to generate a reaction torque.

Currently, there are two basic types of torque support designs in use for parallel offset hollow shaft gearboxes and gearmotors. The first type is a tie rod type torque arm, which is attached to the gearbox at the one end and to the frame or foundation of the driven device at the other end, as shown in FIG. 1. The other type features an integrated torque arm plate with the housing, which is then connected to the driven machinery by a support bracket, arm, pin or plate, as shown in FIG. 2.

The first type, as shown in FIG. 1, is mainly used in gearboxes having a two piece housing construction. The torque arm (tie rod) is attached to the housing with bolts which hold the two gearbox halves together. The disadvantage of this arrangement is that substantial mounting space is required for the tie rods. Furthermore, it is necessary to use two tie rods with an opposite orientation to allow a torque transmittal in both directions. A long tie rod type torque arm arrangement can be desirable in some applications where the driven machinery has no sufficiently rigid structural part close to the gearbox, or where the accessible foundation is far from the drive.

The second type, as shown in FIG. 2, is more space saving because the integrated torque arm can be easily connected with a short support arm or rib of the driven machinery. This design allows a compact drive attachment and torque support arrangement which can support the torque in both rotational directions. However, due to the shape, orientation and position of the integrated torque arm, a tie rod support is not possible. Accordingly, there is a need for more versatile and compact housing constructions for gearboxes and gearmotors to allow for a wider variety of mounting and torque support configurations.

SUMMARY OF THE INVENTION

It is an object of the present invention to provide a housing construction for parallel offset gearboxes and gearmotors that solves the problems associated with the conventional housing constructions described above.

More specifically, it is an object of the present invention to provide a versatile housing construction for parallel offset gearboxes and gearmotors that allows a wide variety of mounting and torque support configurations while minimizing mounting space required.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a universal mount housing construction is provided for parallel offset gearboxes that allows a wide variety of mounting and torque support configurations. The housing construction includes a generally cubic-shaped cast housing member having an input opening in a first side for receiving a rotational power input, and an output opening in a second side for transmitting a rotational power output through a hollow or solid output shaft. Two plate-shaped housing extensions are integrated into the cast housing member and provide a pair of integrated torque arms. Each of the integrated housing extensions have a machined planar surface oriented perpendicular to the central axis of the output opening. A through-bore extends through the machined surface of each of the integrated housing extensions for attaching the housing to torque arm tie rods, machinery frames, foundations, brackets, torque supports, and the like.

A raised ring surface extends around the output opening and has a machined planar surface which is coplanar with the machined planar surfaces of the integrated housing extensions. The raised ring surface has tapped holes spaced about its circumference for flange mounting. Two parallel raised machined surfaces with tapped holes are also formed on the sides of the cast housing member and are oriented parallel to the central axis of the output opening to increase the possible mounting arrangements for the housing.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

The present invention will now be described, by way of example, with reference to FIGS. 3 to 10 of the accompanying drawings.

The present invention features a universal mount housing which allows a wide variety of mounting and torque support configurations, including both of the conventional torque arm arrangements described above.

Figure 4:
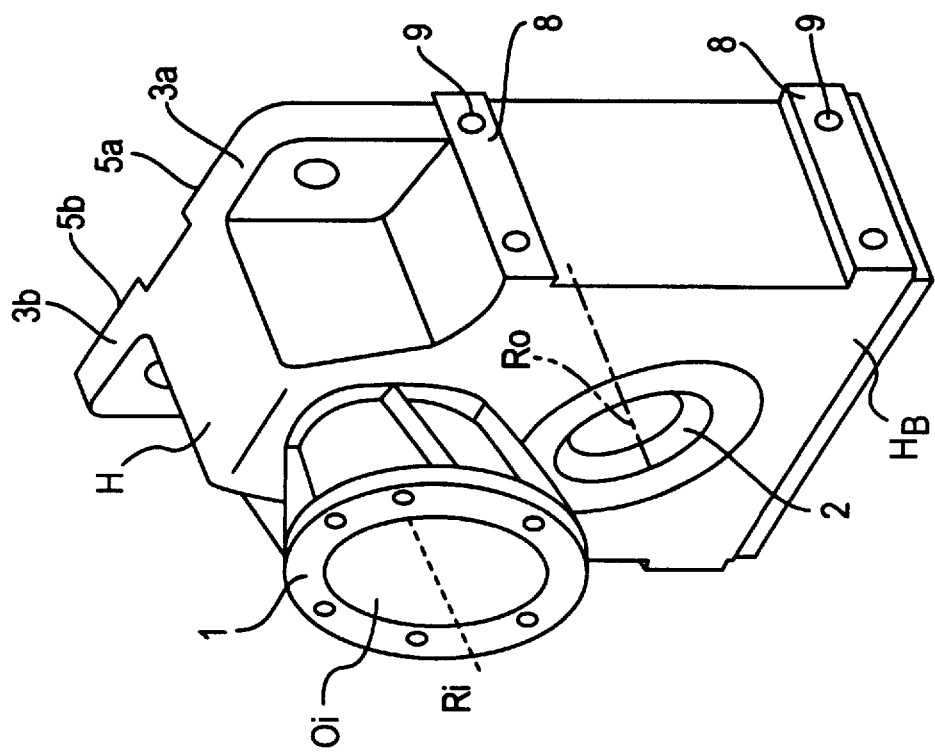
FIG. 4 is a rear perspective view of the gearbox shown in FIG. 3, as viewed in the direction indicated by arrow A in FIG. 3.
Figure 3:
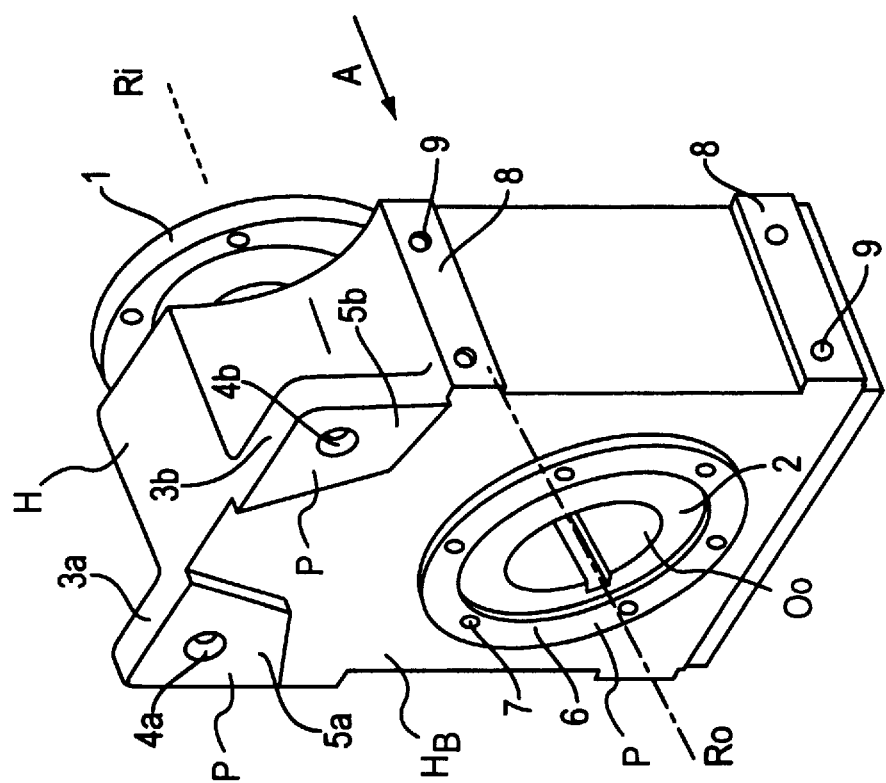
FIG. 3 is a front perspective view of a parallel offset hollow shaft gearbox having a housing construction according to a preferred embodiment of the present invention.

FIGS. 3 and 4 show two views of the universal mount housing H according to the present invention. The housing H has a generally cubic-shaped housing body $H_b$ with integrated sets of flat machined surfaces (described below) which provide easy attachment to driven machinery and the like. The flat machined surfaces have tapped bores that provide a versatile attachment base for a variety of mounting brackets, base plates, torque arms, and other mounting hardware.

As shown in FIGS. 3 and 4, an input flange 1 is provided for attaching the housing H to a prime mover, motor, or primary gearbox (not shown). An input opening Oi having a central axis Ri is provided in the housing H concentric with the flange 1 for receiving a rotational power input into the housing H. A combination of a planetary or other type gearbox or gearmotor, as a ratio sensitive primary stage, with a parallel offset hollow or solid output shaft helical or spur gearbox having a housing construction according to the present invention, is a particularly suitable combination.

An output opening Oo is provided in the housing H for transmitting a rotational power output from the housing H through a suitable output shaft 2. The output shaft 2 is preferably a hollow shaft with a machined inner diameter and key slot, as shown in FIG. 3, but a solid output shaft can also be used. Two plate-shaped extensions 3a, 3b, which have mounting surfaces oriented in a plane P perpendicular to a rotational axis Ro of the output shaft 2, are integrated into the casting of the gearbox housing H as integrated torque arms. The integrated torque arms 3a, 3b are spaced from the output shaft 2 to maximize the length of the effective torque arm while minimizing the size of the housing. Thus, in the arrangement shown in FIG. 3 where the parallel input and output shafts of the gearbox are offset, the integrated torque arms 3a, 3b are formed in the housing remote from the axis Ro of the output shaft 2 but near the axis of the input flange 1. Each of the integrated torque arms 3a, 3b has an appropriately sized through bore 4a, 4b, respectively. A flat surface 5a, 5b of each of the integrated torque arms 3a, 3b is raised and machined flat on an output side of the housing.

A ring-shaped surface 6, which extends around the output shaft 2, is also raised and machined. The machined flat surfaces 5a, 5b, and 6 are all in the same plane P. The machined ring-shaped surface 6 extending around the output shaft 2 has a set of tapped holes 7 spaced circumferentially therearound.

On both sides of the housing are two parallel raised and machined flat mounting surfaces 8 with drilled and tapped holes 9. The flat mounting surfaces 8 on each side of the housing are preferably in the same plane. The flat mounting surfaces 8 extend perpendicular to the machined flat surfaces 5a, 5b, and 6. Thus, the plane of the machined flat surfaces 5a, 5b of the integrated extension plates 3a, 3b and the machined surface 6 is oriented perpendicular to the rotational axis Ro of the output shaft 2, while the planes of the flat mounting surfaces 8 on both sides of the housing are oriented parallel to the rotational axis Ro.

The above-described housing construction makes a wide variety of mounting arrangements possible. A number of such mounting arrangements will now be described, by way of example, with reference to FIGS. 5 to 10 of the accompanying drawings.

Figure 2:
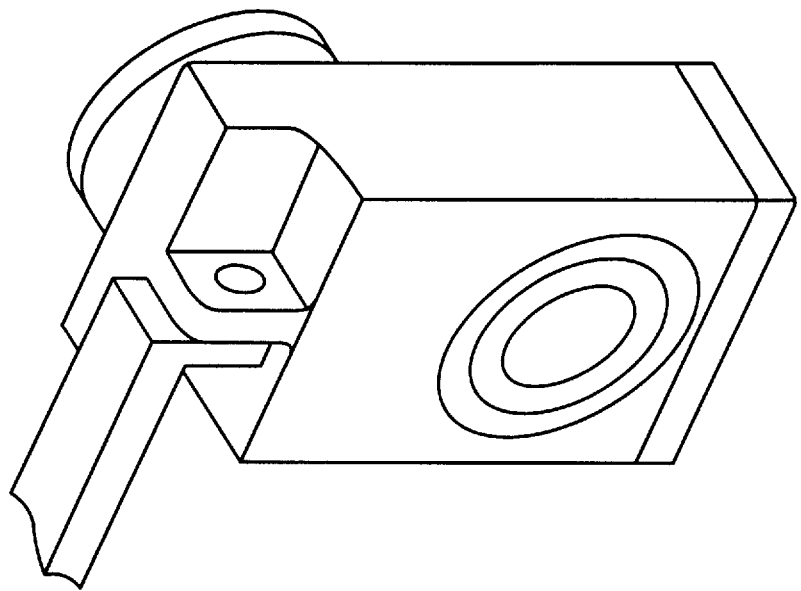
FIG. 2 is a perspective view of a conventional parallel offset hollow shaft gearbox having an integrated torque arm plate for providing a reaction torque.
Figure 1:
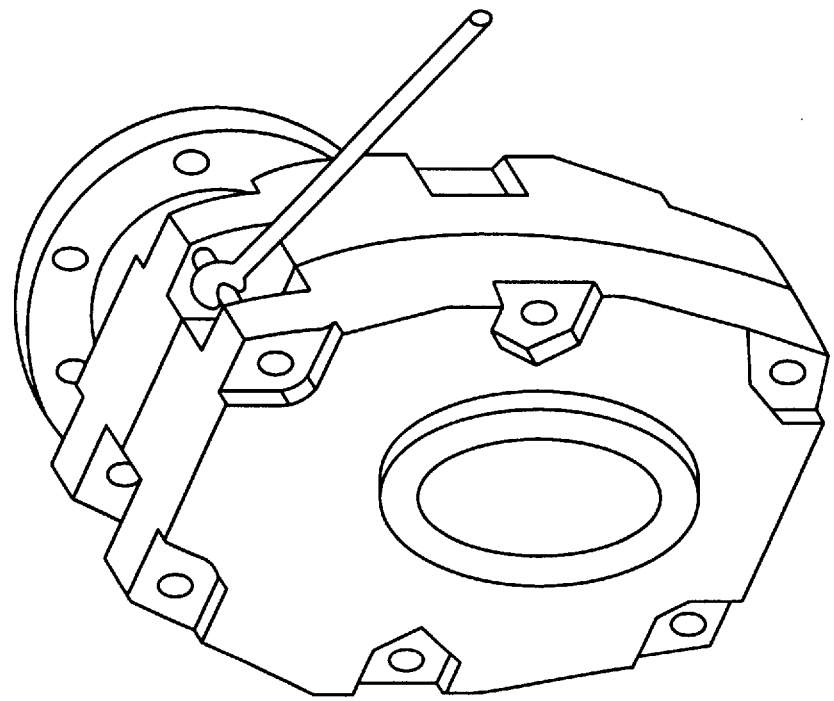
FIG. 1 is a perspective view of a conventional parallel offset hollow shaft gearbox having a tie rod arrangement for providing a reaction torque.
Figure 5:
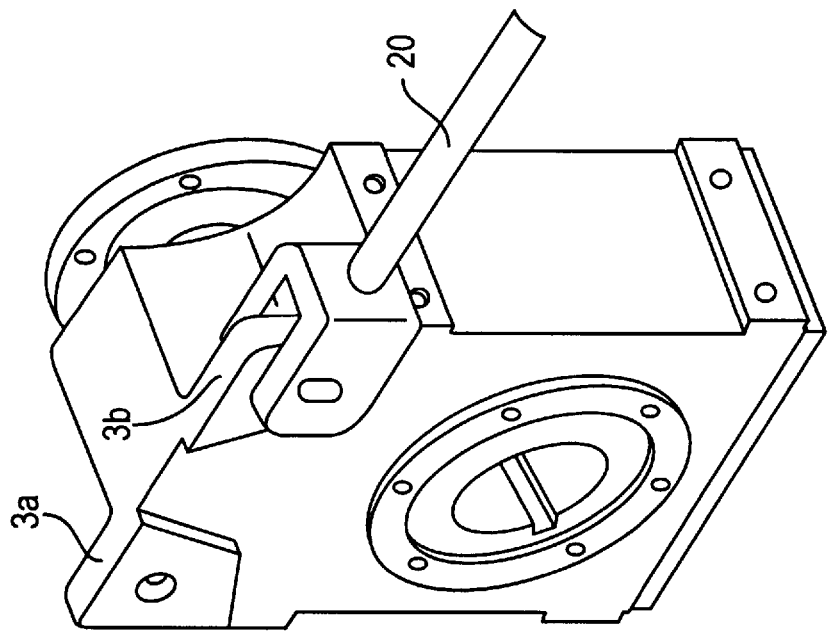
FIG. 5 is a perspective view of the gearbox according to the present invention having a tie rod type torque arm arrangement connected to an integrated torque arm plate of the housing.

FIG. 5 shows a tie rod type torque arm arrangement. The integrated torque arm plates 3a, 3b allow an easy attachment of a tie rod 20, without the need to remove housing bolts as is commonly done on the conventional housing designs, as described above and shown in FIG. 1. The orientation of the torque arm plates 3a, 3b is such that the bending from the reaction force in the torque arm plates 3a, 3b creates a far lower stressing in the plates than in the conventional torque arm plate design described above and shown in FIG. 2.

Figure 6:
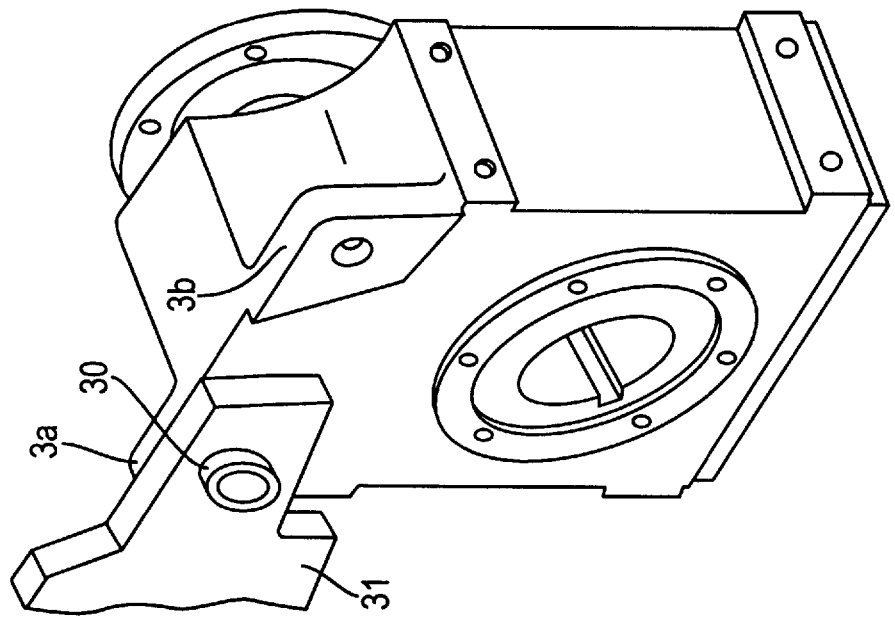
FIG. 6 is a perspective view of the gearbox according to the present invention having a simple bolt or pin connecting an integrated torque arm plate of the housing to a driven machinery frame.

The mounting arrangement shown in FIG. 6 utilizes a simple bolt or pin 30 connected to the driven machinery frame 31 through the bore 4a of the integrated torque arm plate 3a, thereby allowing a very compact mounting.

Figure 7:
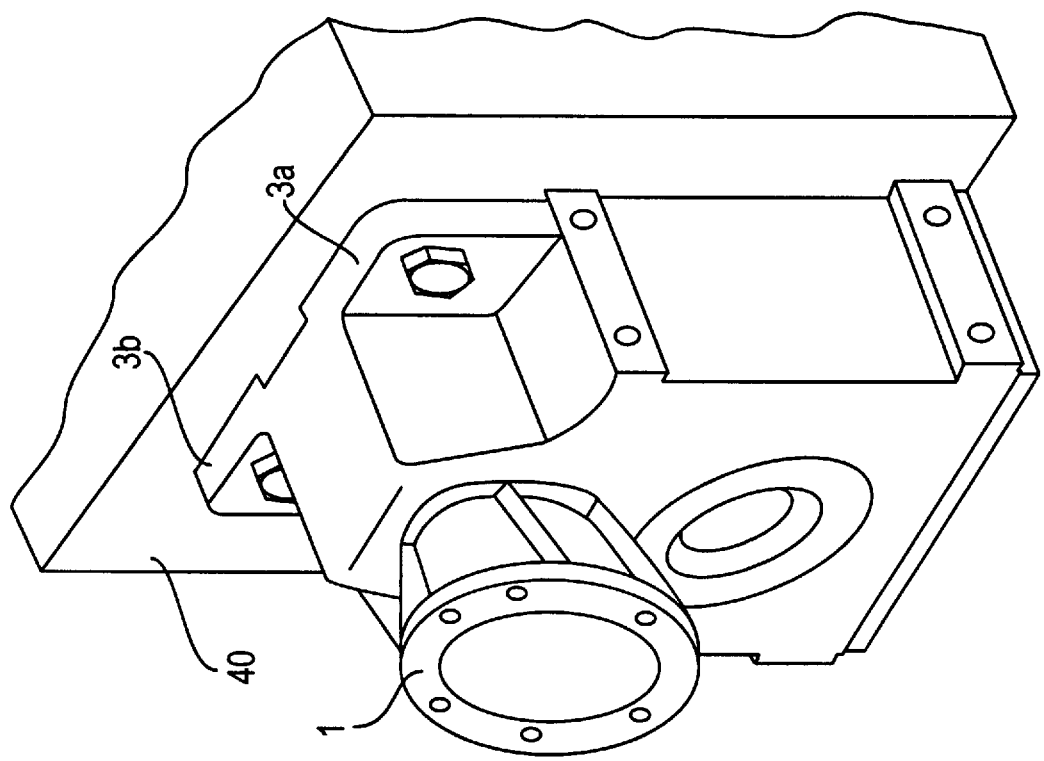
FIG. 7 is a perspective view of the gearbox according to the present invention wherein the housing of the gearbox is bolted flat to a surface of the driven machinery.

Since the torque arm plates 3a, 3b are raised and machined and are in the same plane as the ring surface 6 around the output shaft 2, the housing can be bolted flat to the surface of the driven machinery 40, as depicted in FIG. 7. The internal cylindrical surface around the output shaft 2 can be utilized for centering purposes and for fulfilling the same function a conventional flange attachment offers in an integrated way, but in a much tighter space.

For applications where the commonly used flange attachment is preferable, a flange can be easily attached to the machined ring surface 6 around the output shaft 2 using the pre-drilled and tapped set of holes 7.

The two integrated torque arm plates 3a, 3b also allow an easy attachment of a variety of low cost, fabricated, bracket-type torque arms. The shape and size of the attached brackets are flexible and can be adapted to the actual shape and requirements of the driven equipment frame or other application restrictions. There are virtually countless bracket variations possible, which gives the housing construction of the present invention a great mounting flexibility.

Figure 8:
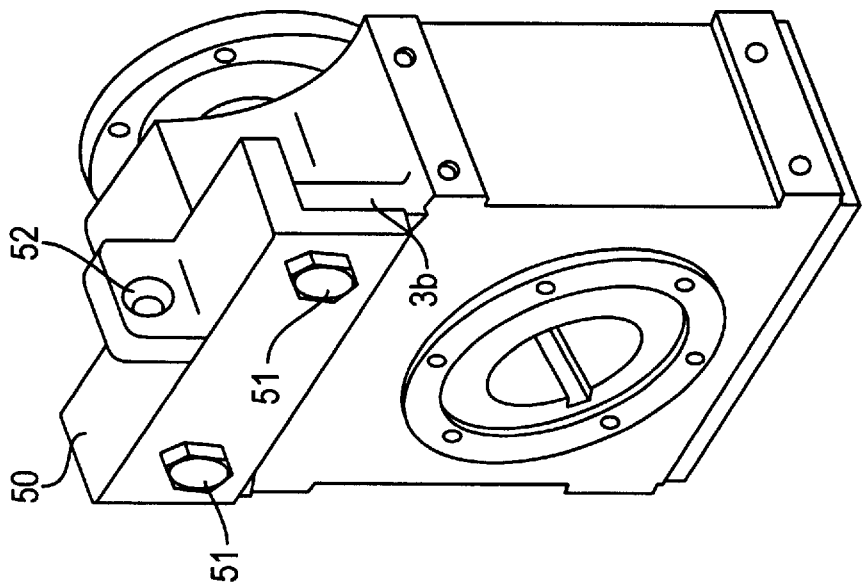
FIG. 8 is a perspective view of the gearbox according to the present invention having a first type of bracket connected thereto.
Figure 9:
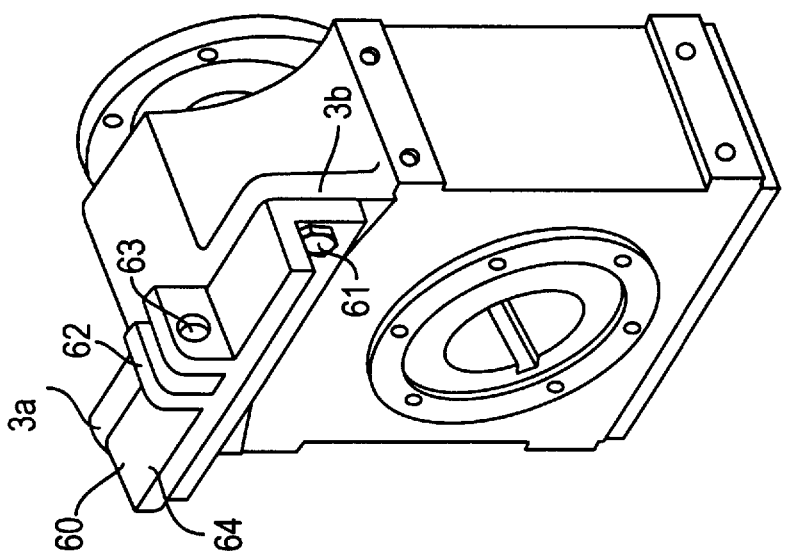
FIG. 9 is a perspective view of the gearbox according to the present invention having a second type of bracket connected thereto.

FIGS. 8 and 9 show two examples of bracket arrangements which are suitable for use with the housing construction of the present invention. As shown in FIG. 8, a first example of a bracket arrangement comprises an angle-shaped member 50 attached to the integrated torque arm plates 3a, 3b with bolts 51. A torque arm connection hole 52 is provided on the angle-shaped member 50 in a similar orientation to the conventional torque arm arrangement shown in FIG. 2.

As shown in FIG. 9, a second example of a bracket arrangement comprises an angle-shaped member 60 attached to the integrated torque arm plates 3a, 3b with bolts 61. A pair of torque arm connection plates 62 having connection holes 63 are provided on the angle-shaped member 60. The bracket arrangement shown in FIG. 9 is different than the bracket arrangement shown in FIG. 8 in that two connection plates are used instead of one, and the flange 64 supporting the connection plates 62 extends away from the integrated torque arm plates 3a, 3b instead of back over the plates. Other bracket arrangements can also be used.

Figure 10:
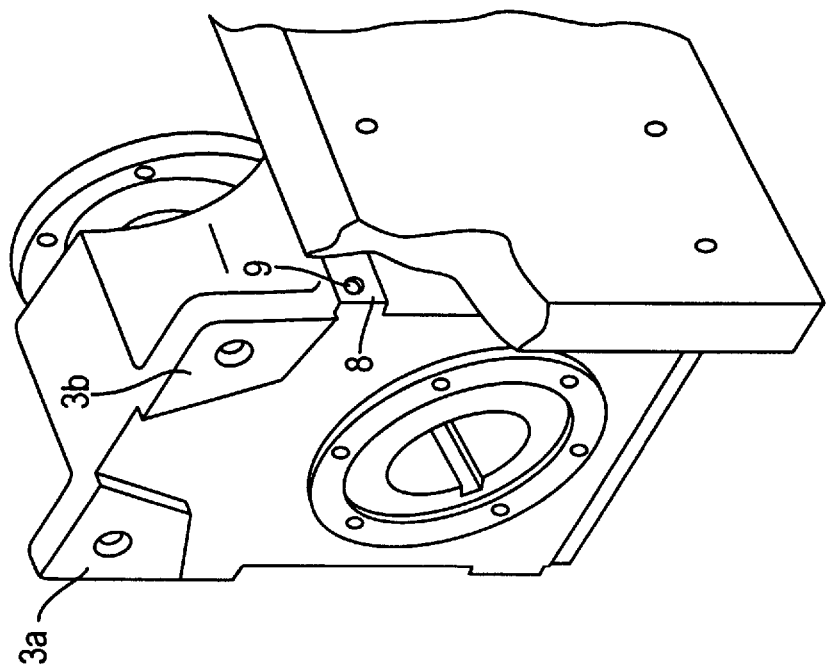
FIG. 10 is a perspective view of the gearbox according to the present invention showing the housing being mounted by two raised parallel machined surfaces formed on the housing.

The two raised parallel machined surfaces 8 with the tapped holes 9 on both sides of the housing make it possible to have a housing mount arrangement, as shown in FIG. 10. A great variation of feet, brackets, special torque arm arrangements, and the like can also be attached to the gearbox, thereby further increasing the mounting versatility of the housing.

The housing construction according to the present invention provides a high degree of flexibility to industrial gearbox and gearmotor users and, at the same time, reduces production and global inventory costs by making it possible to have high volume manufacturing and subsequent stocking of only a single kind of universal housing.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A universal mount housing for a parallel offset gearbox, comprising:
    a housing body having an input opening and an output opening, said output opening having a central axis which is parallel and offset in a direction perpendicular to a central axis of said input opening;
    two plate-shaped housing extensions integrated into a casting of said housing body for supporting said housing body, each of said integrated housing extensions providing an integrated torque arm for said housing, and each of said integrated housing extensions having a flat surface in a plane perpendicular to the central axis of the output opening and a through bore extending through said flat surface for supporting the housing; and
    at least one flat mounting surface in a plane parallel to the central axis of the output opening, said flat mounting surface having holes formed therein for supporting the housing.

2. The universal mount housing as set forth in claim 1, wherein said flat surfaces of said integrated housing extensions are raised surfaces machined on one side to provide an accurate mounting face in said plane perpendicular to the central axis of the output opening.

3. The universal mount housing as set forth in claim 2, further comprising a raised ring surface extending around the output opening, said raised ring surface being machined on a side providing an accurate mounting face in said plane perpendicular to the central axis of the output opening, said raised ring surface and said raised surfaces of the integrated housing extensions defining a three-point support.

4. The universal mount housing as set forth in claim 1, further comprising a raised ring surface extending around the output opening, said raised ring surface being machined on a side providing an accurate mounting face in said plane perpendicular to the central axis of the output opening, said raised ring surface having tapped holes spaced circumferentially therearound for providing a bolt-on flange arrangement.

5. A universal mount housing for a parallel offset gearbox comprising:
    a housing body having an input opening and an output opening, said output opening having a central axis which is parallel and offset in a direction perpendicular to a central axis of said input opening;
    two plate-shaped housing extensions integrated into a casting of said housing body for supporting said housing body, each of said integrated housing extenions providing an integrated torque arm for said housing, and each of said integrated housing extensions having a flat surface in a plane perpendicular to the central axis of the output opening; and
    two parallel raised and machined flat mounting surfaces with tapped holes formed on two sides of the housing body for increasing possible mounting arrangements for the housing.

6. A universal mount housing for a parallel offset gearbox, comprising:
    a cast housing body having an input opening and an output opening, said output opening having a central axis which is parallel and offset in a direction perpendicular to a central axis of said input opening;
    two plate-shaped housing extensions integrated into said cast housing body for providing a pair of integrated torque arms, each of said integrated housing extensions having a machined flat surface in a plane oriented perpendicular to the central axis of the output opening, and a through-bore extending through each of said integrated housing extensions in a direction parallel to the central axis of said output opening; and
    a raised ring surface extending around the output opening, said raised ring surface having a machined planar surface in said plane which is coplanar with the machined flat surfaces of the integrated housing extensions, said raised ring surface having tapped holes spaced about a circumference thereof which extend into said raised ring surface in a direction parallel to the central axis of said output opening.

7. The universal mount housing as set forth in claim 6, further comprising two parallel raised and machined flat mounting surfaces with tapped holes formed in the cast housing body, the parallel raised and machined flat mounting surfaces being oriented parallel to the central axis of said output opening.

8. The universal mount housing as set forth in claim 7, wherein the machined flat surfaces on the integrated housing extensions, the raised ring surface extending around the output opening, and the parallel and raised machined flat mounting surfaces formed in the cast housing body permit accurate and flexible mounting of the cast housing body on three sides of the cast housing body.

9. The universal mount housing as set forth in claim 6, wherein said through-bores extending through each of said integrated housing extensions are closer to the central axis of said input opening than to the central axis of said output opening.

* * * * *